(No Model.) 4 Sheets—Sheet 1.
J. E. McKAY.
CREMATORY FOR BURNING GARBAGE AND OTHER REFUSE.
No. 530,623. Patented Dec. 11, 1894.
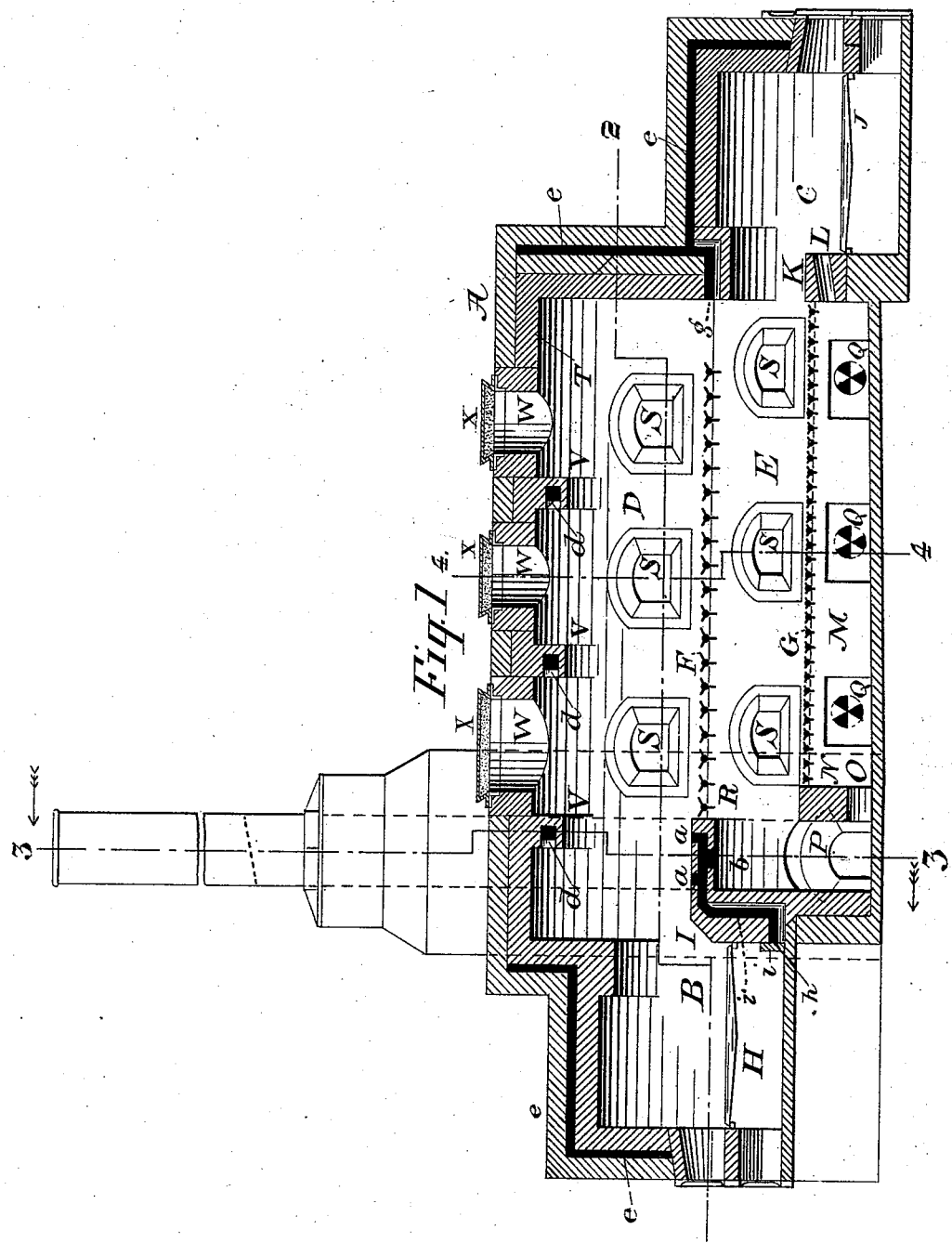
WITNESSES:
John W. McKay
Ed. D. Miller
INVENTOR
John E. McKay,
BY
Chas. C. Gill
ATTORNEY.

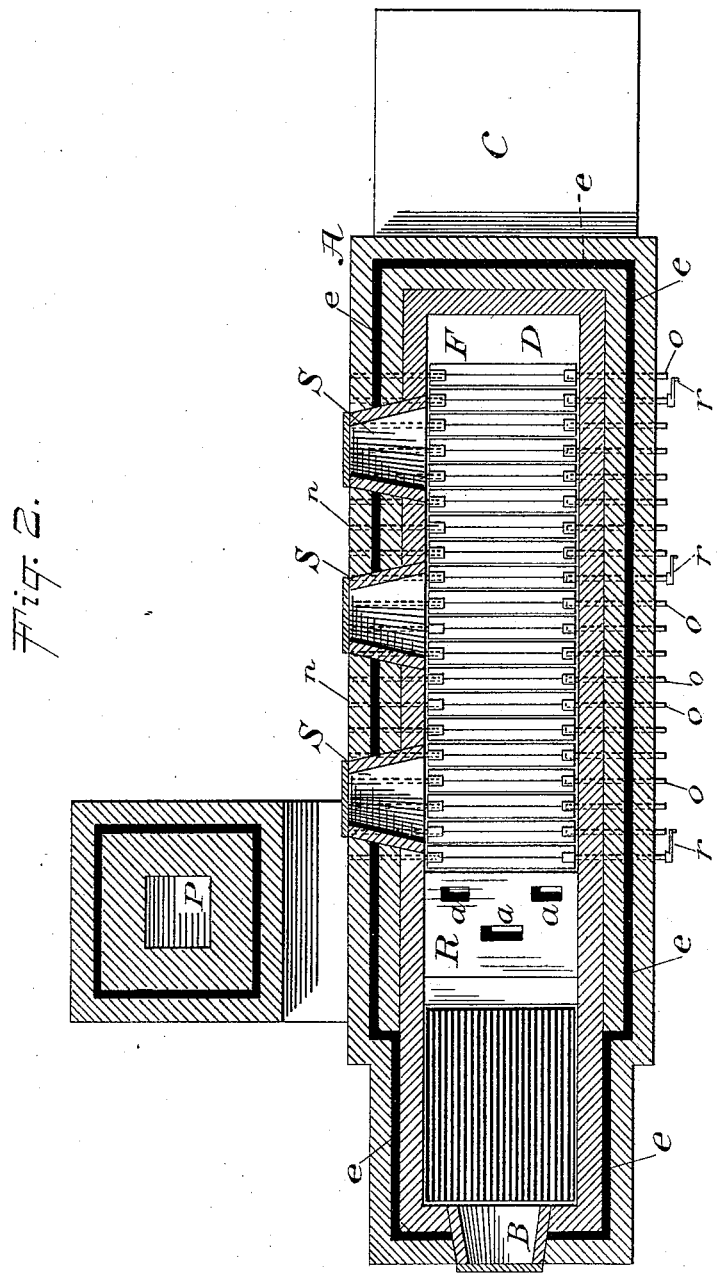

(No Model.) 4 Sheets—Sheet 3.
J. E. McKAY.
CREMATORY FOR BURNING GARBAGE AND OTHER REFUSE.
No. 530,623. Patented Dec. 11, 1894.
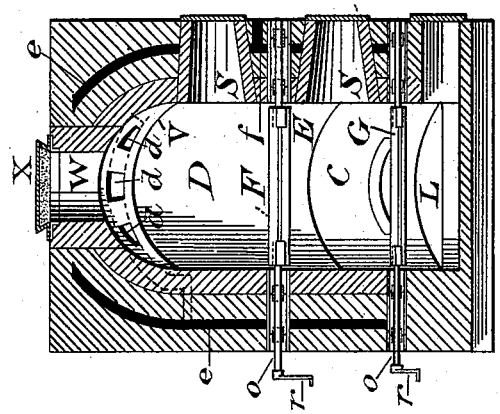
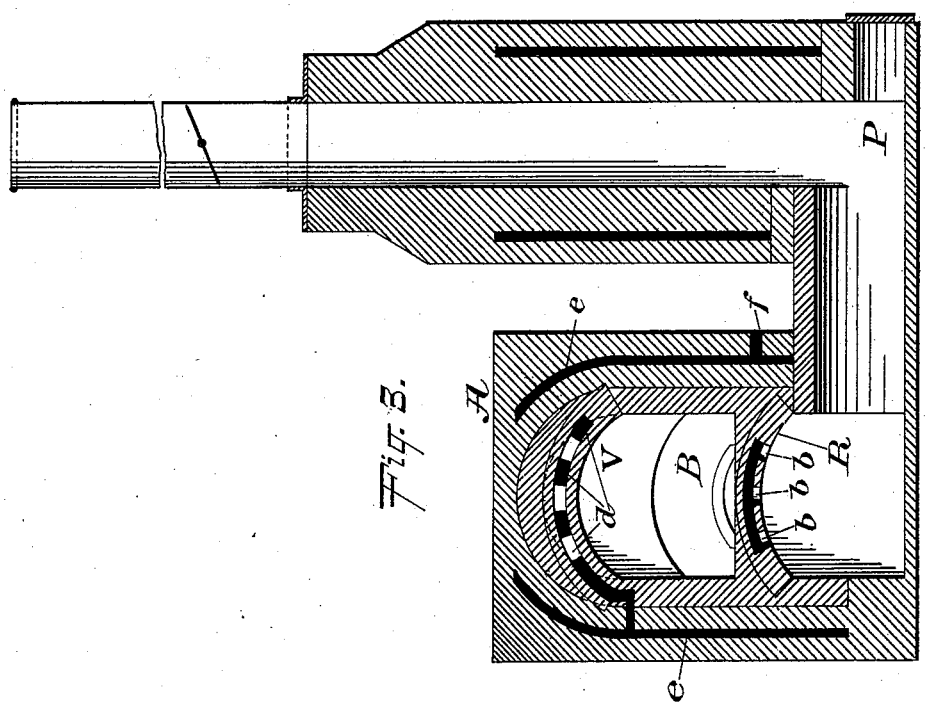

(No Model.) 4 Sheets—Sheet 4.
J. E. McKAY.
CREMATORY FOR BURNING GARBAGE AND OTHER REFUSE.
No. 530,623. Patented Dec. 11, 1894.
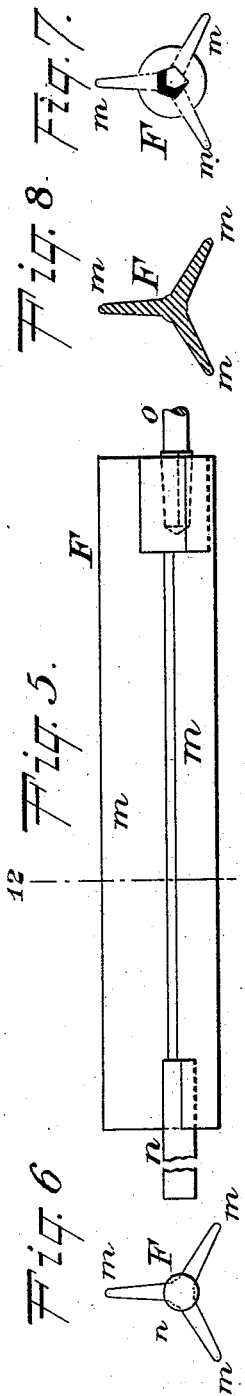
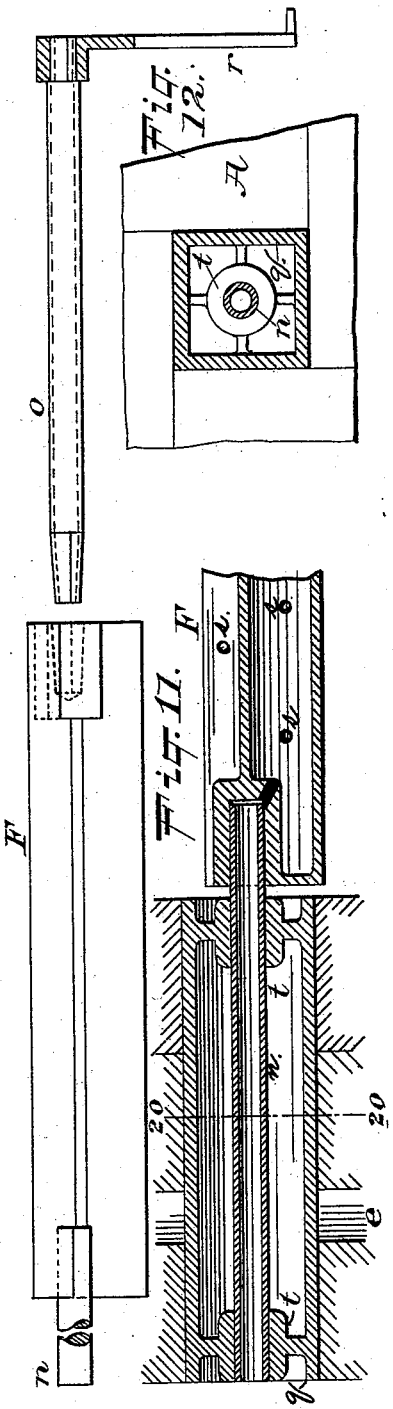
WITNESSES:
John W. McKay
Ed. D. Miller.
INVENTOR
John E. McKay,
BY
Chas. C. Gill
ATTORNEY.

UNITED STATES PATENT OFFICE.

JOHN E. McKAY, OF NEW YORK, N. Y.

CREMATORY FOR BURNING GARBAGE AND OTHER REFUSE.

SPECIFICATION forming part of Letters Patent No. 530,623, dated December 11, 1894.

Application filed January 4, 1894. Serial No. 495,633. (No model.)

*To all whom it may concern:*

Be it known that I, JOHN E. MCKAY, a citizen of the United States, and a resident of New York, in the county of New York and State of New York, have invented certain new and useful Improvements in Crematories for Burning Garbage and other Refuse, of which the following is a specification.

The invention relates to improvements in crematories for burning garbage and other refuse substances or material, and consists in a crematory having furnaces at each end and an intermediate receiving chamber or retort which is subdivided by an upper and lower series of supporting or grate bars for the refuse into two compartments communicating with the furnaces.

The invention further consists in novel features of construction pertaining to the air supply for the receiving chamber or retort, and also in novel revoluble winged supporting or grate bars for the refuse, and in certain features of arrangement and construction and combinations of parts, all as hereinafter more fully described and particularly pointed out in the claims.

The object of the invention is to produce a crematory of sufficient capacity in which the garbage and other refuse of cities and towns may with absolute certainty be rapidly, economically and thoroughly reduced to ashes. The precise nature of the invention and the method of using the crematory constructed in accordance therewith will be more fully understood from the detailed description hereinafter presented, reference being had to the accompanying drawings, in which—

Figure 1 is a central vertical longitudinal section through a crematory constructed in accordance with and embodying the invention. Fig. 2 is a horizontal longitudinal section of same on the dotted line 2—2 of Fig. 1. Fig. 3 is a vertical transverse section of same on the dotted line 3—3 of Fig. 1. Fig. 4 is a like view of same on the dotted line 4—4 of Fig. 1. Fig. 5 is an enlarged detached side view of one of the revoluble winged grate bars for supporting the refuse. Fig. 6 is a view of one end of same. Fig. 7 is a view of the opposite end of same. Fig. 8 is a vertical section of same on the dotted line 12—12 of Fig. 5. Fig. 9 is a side view of one of the revoluble winged grate bars, with the means for turning same, the said means, (designated as Fig. 10) consisting of a crank and connecting bearing rod or tube intended to extend through one wall of the crematory. Fig. 11 is an enlarged vertical section through a portion of one wall of the crematory and illustrating on an enlarged scale the bearing and means for supporting the ends of the revoluble winged grate bars; and Fig. 12 is a vertical section of same on the dotted line 20—20 of Fig. 11.

In the drawings A designates the crematory, which is substantially rectangular in general outline and is provided at its ends with the furnaces B, C, and within its central portion with the compartments D, E, and a series of revoluble winged grate bars F, G, the latter extending in parallel lines from side to side of the crematory and having their ends supported by the walls thereof. The series of grate bars F, G, sub-divide the main receiving chamber of the crematory into the compartments D, E, the compartment D and furnace B being in direct communication with each other and the compartment E and furnace C being in direct communication with each other, as indicated more clearly in Fig. 1.

The furnace B is provided with the usual grate bars H and the upper edge of its bridge wall I is about on a line with the series of supporting bars F; and likewise the furnace C is supplied with the customary grate bars J and the upper edge of its bridge wall K is about on a line with the series of supporting bars G.

In the bridge wall K is formed the inclined opening L leading from the furnace C into the chamber M located below the series of supporting bars G. At the inner end of the chamber M is the wall N containing in its lower portion an outlet opening O leading to the flue P, and at the side of the chamber M are the doors Q through which the ashes may be removed and which in the use of the crematory may be used for the purpose of admitting air below the series of supporting bars G.

At the inner end of the compartment E is the arch R, below which is the entrance to the escape flue P and in which are the outlets $a$, $b$ (the former opening upward and the latter downward) for air from the space $i'$, in the bridge wall I. The entrance to the space $i'$ is at the opening $h$, which may be regulated by a damper $i$.

The walls of the crematory at the sides of the compartments D, E, are provided with openings S having doors, the purpose of the openings being to admit a rod or other instrument with which to agitate or move the refuse on the supporting bars F, G.

The ceiling T of the main receiving chamber of the crematory is formed with the arches V which are hollow and contain the outlets $d$ for air. In addition to affording strength and furnishing air outlets $d$, the arches V serve to prevent the flames from traveling along the ceiling T by diverting them downward against the refuse on the series of supporting bars F.

In the roof of the crematory are the inlets W for the garbage or other refuse to be burned, said inlets being provided with the removable covers X of any suitable construction.

Within the walls of the crematory and furnaces are formed the air spaces $e$ all of which are in communication with each other, the inlet to said spaces being designated by the letter $f$ and the outlets for the air therefrom by the letters $d, g$. The air entering the spaces $e$ and circulating through the walls of the crematory prevents the undue heating of the outer walls and becomes heated prior to its introduction into the compartments D, E, or the furnaces, and hence in accordance with the invention the air is heated, prior to its discharge, but it is not heated to that extent which would deprive it of its oxygen.

The supporting bars F, G, form an important part of the invention, and they are more clearly shown in Figs. 5 to 12 inclusive, in which it will be seen that the bars may be either solid or hollow and that they are composed of wings $m$ radiating from a common center.

I do not confine the invention to the number of wings $m$ the bars F, G, shall have, but I prefer that each bar have three equidistant wings, as shown. The bars F, G, are revoluble and at their ends are supported on rods $n, o$, which are sustained in suitable bearings $q$ in the walls of the crematory. The rods $o$ at one end enter a socket formed in the end of the bars F, G, and at their other end are angular in cross-section to receive the crank $r$, as indicated in Figs. 9 and 10, the purpose of the crank being to afford a means whereby the bars may be revolved.

When the bars F, G, are solid, the rods $n, o$, may also be solid, and when the said bars are hollow the rods $n, o$, will also be hollow so as to admit air through them to the bars, from which the air will escape in a subdivided state through the apertures $s$, shown in Fig. 11. The bearings $q$ are open around their central supporting hubs $t$, as shown more clearly in Fig. 12, for the purpose of admitting air through them to the compartments D, E, in aid of proper combustion.

When the supporting bars F, G, are in the position illustrated in Fig. 1, their converging upper wings serve to receive and retain the garbage or other refuse to be burned, and when said bars are turned by means of the crank $r$ the refuse will fall between them, that falling from the bars F being caught on the bars G and that falling from the bars G descending to the bottom of the chamber or pit M in the condition of ashes, which may be withdrawn through the door openings Q.

When the bars F, G, have three wings $m$ they will by means of the crank $r$ be given a one-third revolution, as frequently as necessary, so as to present a new surface to the refuse to be burned, this method of using the bars being found desirable in that thereby they are preserved against twisting or warping and their longevity of usefulness materially increased. The intense heat generated within the receiving chamber of the crematory has a great tendency to rapidly destroy the bars supporting the refuse, and it is for this reason that I have designed and perfected the winged revoluble supporting bars F, G, which have proven to be durable and capable of resisting the heat of the crematory.

In the employment of the crematory, the fires will be started in the furnaces B, C, and thereafter the garbage or other refuse to be burned will be deposited through the inlets W upon the series of supporting bars F, where it will be allowed to remain until dried and partially burned, after which by turning the bars F the material will be allowed to descend to the bars G, on which it will be thoroughly incinerated, the resulting ashes by the turning of the bars G being thereafter caused to descend to the chamber or pit M. While the material on the bars G is being consumed, a fresh supply of the refuse will be deposited on the bars F on which it will be dried and partly burned preparatory to its being dropped upon the bars G after the latter shall have been freed from the material thereon. During the proper use of the crematory both series of bars F, G, are kept constantly supplied with the refuse, the upper bars retaining the material until it is dried and partially burned, while the material on the lower bars is being thoroughly consumed; and as rapidly as the material on the lower bars G is reduced to ashes and the latter caused to descend to the chamber M, the refuse on the bars F will be delivered to the bars G and an additional charge of the refuse deposited on the bars F. The flames and heat from the furnace B will sweep over and mingle with the refuse on the bars F, and the flames and heat from the furnace C will pass into direct contact with the material on the bars G, and at the same time there will be a proper admission of air to the receiving chamber of the crematory from the exit openings $a, b, d, g$, and through the door openings Q below the supporting bars G, to effect proper combustion and the complete incineration of the refuse. The purpose of the opening L in the bridge wall K is to permit a portion of the flames or heat from the furnace C to reach the inclined floor of the chamber M and effect the evaporation of any liquid which might descend upon the same from the refuse supported on the bars F, G.

The disposition of the outlets for air to the receiving chamber of the crematory is such as to afford the proper supply of air thereto at points where it will be most effective in the promotion of perfect combustion and in condition to produce the best results, since in accordance with the arrangement of air supply shown and described, the air is properly distributed and not deprived of its oxygen before reaching the points where it is to support combustion.

The crematory above described possesses not only the advantage of proper air supply but is of duplex capacity being provided with two compartments in which the refuse is constantly subjected to the direct action of the furnaces, the said refuse being partly dried and burned in one compartment and then finally consumed in the other compartment.

I do not limit the invention to the precise arrangement and details described above, except as hereinafter claimed, for it is obvious that the location of the flue P could be changed and that by proper changes, within the scope and spirit of my invention, the furnace B could be made to communicate with the compartment E and the furnace C with the compartment D.

A crematory of large capacity and constructed in accordance with and embodying my invention herein claimed has been constructed and put into practical and successful use.

Without confining the invention to mechanical details, what I claim as new, and desire to secure by Letters Patent, is—

1. The crematory having the main central receiving chamber for the refuse to be burned, and a furnace at each end thereof, the said furnaces being on different planes, combined with the upper series of dumping bars extending substantially the length of said receiving chamber in line with one of said furnaces, the lower series of dumping bars extending substantially the length of said receiving chamber in line with the other of said furnaces, whereby the products of combustion from one furnace pass over the top of its adjacent series of dumping bars and then combine with the products of combustion from the other furnace, the products of combustion from the two furnaces then passing lengthwise over the series of dumping bars in line with the second furnace, the ash chamber below said lower series of bars and having doors, and the outlet flue to receive the said combined products of combustion from the two furnaces; substantially as and for the purposes set forth.

2. The crematory having the main central receiving chamber for the refuse to be burned, and a furnace at each end thereof, said furnaces being on different planes, combined with the upper series of dumping bars extending substantially the length of said receiving chamber in line with one of said furnaces, the lower series of dumping bars extending substantially the length of said receiving chamber in line with the other of said furnaces, whereby the products of combustion from one furnace pass over the top of the upper series of dumping bars and then combine with the products of combustion from the lower furnace, the products of combustion from the two furnaces then passing lengthwise between the upper and lower series of dumping bars, the ash chamber below said lower series of bars and having doors, and the outlet flue connected with the space between the upper and lower dumping bars and with the chamber beneath said lower series of bars, substantially as and for the purposes set forth.

3. The crematory having the main central receiving chamber for the refuse to be burned, and a furnace at each end thereof, said furnaces being on different planes, combined with the upper series of dumping bars extending substantially the length of said receiving chamber in line with one of said furnaces, the lower series of grate bars extending substantially the length of said receiving chamber in line with the other of said furnaces, whereby the products of combustion from one furnace pass over the top of the upper series of dumping bars and then combine with the products of combustion from the lower furnace, the products of combustion from the two furnaces then passing lengthwise between the upper and lower series of bars, the ash-chamber below said lower series of bars and having doors, doors to said receiving chamber above the upper series of bars, doors to said receiving chamber between the two series of bars inlets for refuse at the top of said receiving chamber, and an outlet flue connected with said receiving chamber; substantially as set forth.

4. The crematory having the main central receiving chamber for the refuse to be burned, and a furnace at each end thereof, said furnaces being on different planes, combined with the upper series of dumping bars extending substantially the length of said receiving chamber in line with one of said furnaces, the lower series of dumping bars extending substantially the length of said receiving chamber in line with the other of said furnaces, the ash chamber below said lower series of bars and having doors, the outlet flue connected with said receiving chamber, and the series of arches extending downward from the ceiling of said chamber and forming air inlets thereto; substantially as and for the purposes set forth.

5. The crematory having at its ends the furnaces B, C, the intermediate receiving chamber, the arch R at the bridge wall of the upper furnace, the outlet flue communicating with said chamber below said arch, the inlets W to said chamber, and the doors S, at the sides of said chamber, combined with the upper series of supporting bars extending substantially the length of said receiving chamber in line with said arch, the lower series of supporting bars extending substantially the length of said chamber in line with the lower furnace, and the ash chamber provided with the doors Q below the lower series of bars; substantially as and for the purposes set forth.

6. The crematory having the main central receiving chamber for the refuse to be burned, and a furnace at each end thereof, combined with the upper series of revoluble winged supporting bars extending substantially the length of said receiving chamber in line with one of said furnaces, the lower series of revoluble winged supporting bars extending substantially the length of the said chamber in line with the other of said furnaces, and the ash chamber below the lower series of bars; substantially as set forth.

7. The crematory having the main receiving chamber and a furnace at each end thereof, combined with the series of winged revoluble supporting bars in said chamber to receive the refuse, the rods at the ends of said bars, and the open bearings $q$ in the sides of the receiving chamber to receive said rods; substantially as set forth.

8. The crematory having the main receiving chamber and a furnace at each end thereof, combined with the bridge wall I having the air space $i'$ and outlets $a$, the bridge wall K, the upper and lower series of supporting bars F, G, in said chamber, the ash chamber below the lower series of bars, and the outlet flue; substantially as set forth.

9. The crematory having the main receiving chamber and a furnace at each end thereof, combined with the bridge wall I, the bridge wall K having the opening L, the upper and lower series of supporting bars F, G, in said chamber, the ash chamber below the lower series of bars, and the outlet flue; substantially as set forth.

Signed at New York, in the county of New York and State of New York, this 2d day of January, A. D. 1894.

JOHN E. McKAY.

Witnesses:
CHAS. C. GILL,
ED. D. MILLER.